United States Patent
Wietelmann et al.

(10) Patent No.: US 9,649,688 B2
(45) Date of Patent: May 16, 2017

(54) LITHIUM POWDER ANODE

(71) Applicant: Rockwood Lithium GmbH, Frankfurt am Main (DE)

(72) Inventors: Ulrich Wietelmann, Friedrichsdorf (DE); Ute Emmel, Frankfurt am Main (DE); Christoph Hartnig, Eppstein (DE)

(73) Assignee: Rockwood Lithium GmbH (DE)

( * ) Notice: Subject to any disclaimer, the term of this patent is extended or adjusted under 35 U.S.C. 154(b) by 0 days.

(21) Appl. No.: 14/652,849

(22) PCT Filed: Dec. 12, 2013

(86) PCT No.: PCT/EP2013/076364
§ 371 (c)(1),
(2) Date: Jun. 17, 2015

(87) PCT Pub. No.: WO2014/095561
PCT Pub. Date: Jun. 26, 2014

(65) Prior Publication Data
US 2015/0333332 A1   Nov. 19, 2015

(30) Foreign Application Priority Data

Dec. 19, 2012  (DE) .................. 10 2012 223 826
Feb. 20, 2013  (DE) .................. 10 2013 202 769

(51) Int. Cl.
| | | |
|---|---|---|
| H01M 4/13 | (2010.01) | |
| B22F 1/00 | (2006.01) | |
| H01M 4/36 | (2006.01) | |
| B22F 3/22 | (2006.01) | |
| B22F 7/08 | (2006.01) | |
| H01M 4/04 | (2006.01) | |
| H01M 4/134 | (2010.01) | |
| H01M 4/1395 | (2010.01) | |
| H01M 4/38 | (2006.01) | |
| H01M 4/62 | (2006.01) | |
| H01M 4/02 | (2006.01) | |
| H01M 10/052 | (2010.01) | |

(52) U.S. Cl.
CPC .............. *B22F 1/0062* (2013.01); *B22F 3/22* (2013.01); *B22F 7/08* (2013.01); *H01M 4/0404* (2013.01); *H01M 4/0435* (2013.01); *H01M 4/134* (2013.01); *H01M 4/1395* (2013.01); *H01M 4/366* (2013.01); *H01M 4/382* (2013.01); *H01M 4/622* (2013.01); *H01M 10/052* (2013.01); *H01M 2004/021* (2013.01); *H01M 2004/027* (2013.01); *Y02P 70/54* (2015.11)

(58) Field of Classification Search
CPC  B22F 1/0062; B22F 3/22; B22F 7/08; H01M 10/052; H01M 2004/021; H01M 2004/027; H01M 4/0404; H01M 4/0435; H01M 4/134; H01M 4/1395; H01M 4/366; H01M 4/382; H01M 4/622; Y02E 60/122; Y02P 70/54
See application file for complete search history.

(56) References Cited

U.S. PATENT DOCUMENTS

| | | |
|---|---|---|
| 5,891,593 A | 4/1999 | Keller et al. |
| 8,021,496 B2 | 9/2011 | Yakovleva et al. |
| 8,377,236 B2 | 2/2013 | Yakovleva et al. |
| 2004/0002005 A1* | 1/2004 | Gao ............ H01M 4/13 429/231.95 |

(Continued)

FOREIGN PATENT DOCUMENTS

| | | |
|---|---|---|
| DE | 196 42 878 A1 | 5/1997 |
| WO | 2008/143854 A1 | 11/2008 |

(Continued)

OTHER PUBLICATIONS

Kim, et al. "Electrochemical Behavior of Compacted Lithium Powder Electrode in Li/V2O5 Rechargeable Battery", J. of The Electrochemical Society. 157 (8) (2010), pp. A984-A987.
Kwon, et al. "Characteristics of a lithium-polymer battery cased on a lithium powder anode", J. of Power Sources 93 (2001), pp. 145-150.
Park, et al. "Characteristics of a Li/MnO2 battery using a lithium powder anode at high-rate discharge", J. of Power Sources 114 (2003), pp. 237-243.
Watanabe, et al. "Electrochemical properties of aryladamantanes as new overcharge protection compounds for lithium cells", J. of Power Sources 154 (2006), pp. 246-254.
Winter, et al. "Electrochemistry. Rechargeable Catteries", Chemie in unserer Zett 6 (1999), pp. 320-332, with English translation.

*Primary Examiner* — Patrick Ryan
*Assistant Examiner* — Ben Lewis
(74) *Attorney, Agent, or Firm* — Jeremy J. Kliebert

(57) ABSTRACT

A lithium anode containing spherical lithium metal particles with an average diameter of between 5 and 200 μm, which are bonded with a fluorine-free rubber-like binding agent from the groups saturated polyolefins and polyolefin copolymers, such as EPM (ethylene-propylene copolymers), EPDM (ethylene-propylene terpolymers) and polybutenes unsaturated polymers (diene polymers and diene copolymers), such as natural rubbers (NR), butadiene rubbers (BR), styrene-butadiene rubbers (SBR), polyisoprene rubbers and butyl rubbers (IIR, such as polyisobutylene isoprene rubber, PIBI) as well as heteroelement-containing copolymers, for example saturated copolymer rubbers, such as ethylene vinyl acetate (EVM), hydrogenated nitrile-butadiene rubber (HNBR), epichlorhydrin rubber (ECO), acrylate rubbers (ACM) and silicon rubbers (SI), as well as unsaturated copolymers, such as nitrile rubbers (NBR), for example, as well as galvanic cells containing the bonded lithium anode according to the invention and method for producing the bonded lithium anode.

20 Claims, 7 Drawing Sheets

(56) References Cited

U.S. PATENT DOCUMENTS

2007/0190422 A1* 8/2007 Morris ................. H01M 4/364
                                                             429/231.4
2011/0269018 A1* 11/2011 Kono ................. C01G 45/1228
                                                             429/217
2013/0181160 A1    7/2013 Wietelmann

FOREIGN PATENT DOCUMENTS

WO    2012/052265 A2    4/2012
WO    2012/100983 A1    8/2012

* cited by examiner

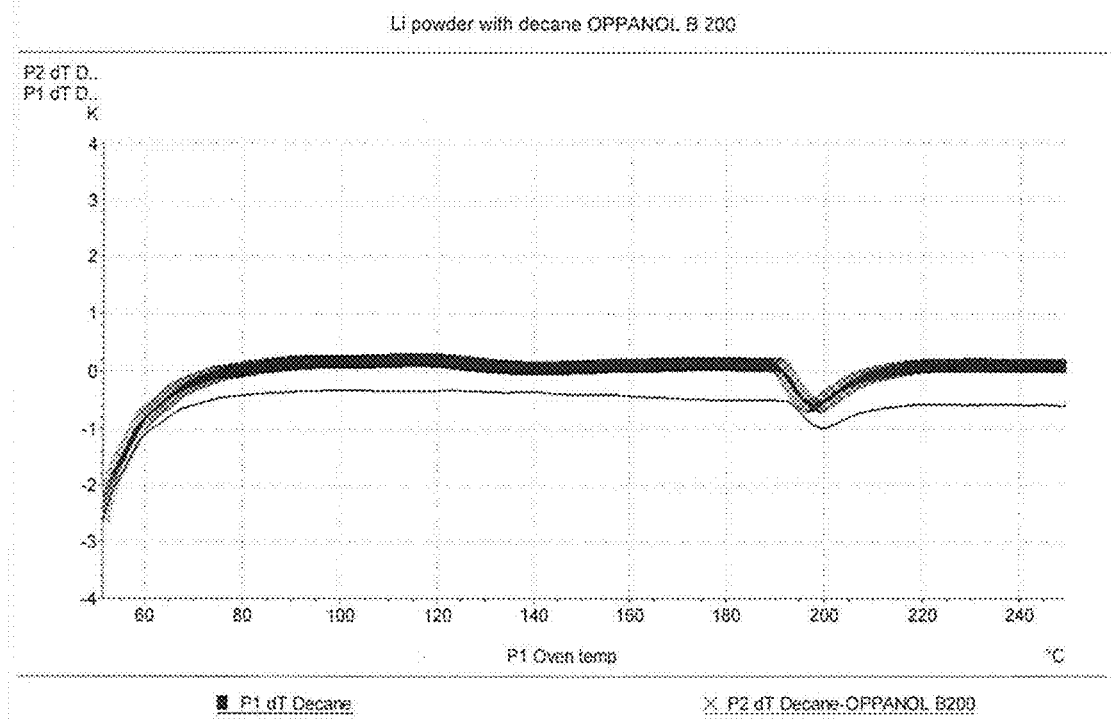
Fig. 1: Stability of Li-powder in contact with decane or decane-OPPANOL B200
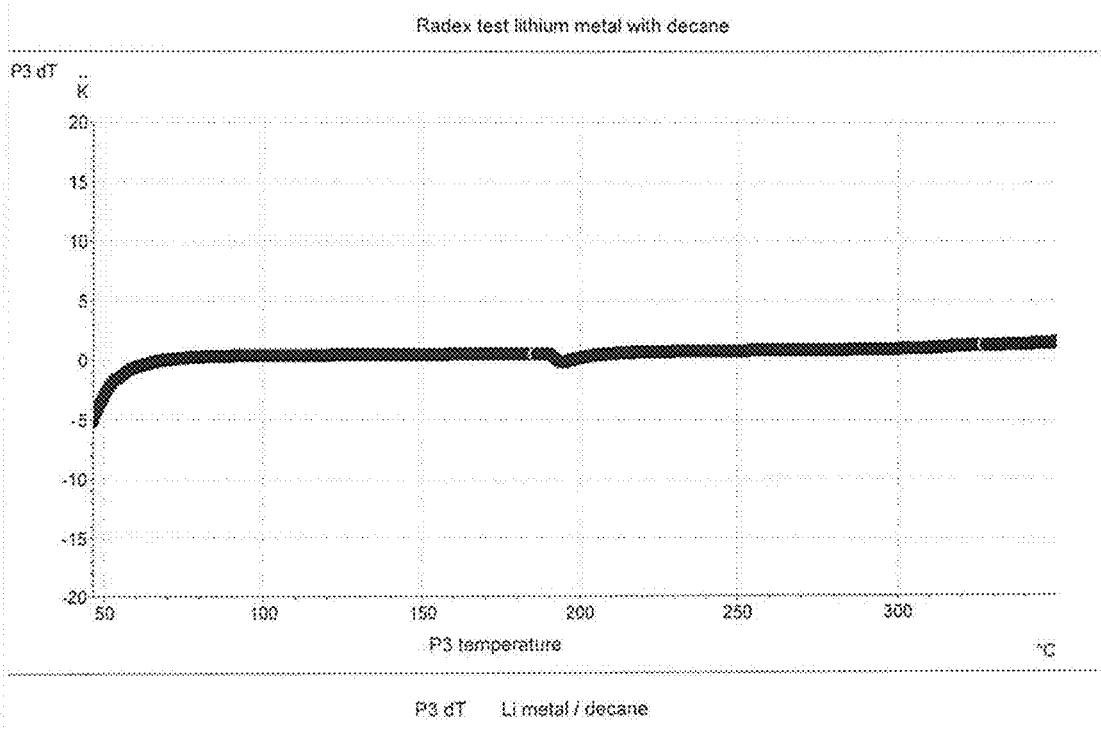
Fig. 2: Stability of Li-Powder in contact with decane to 350 °C

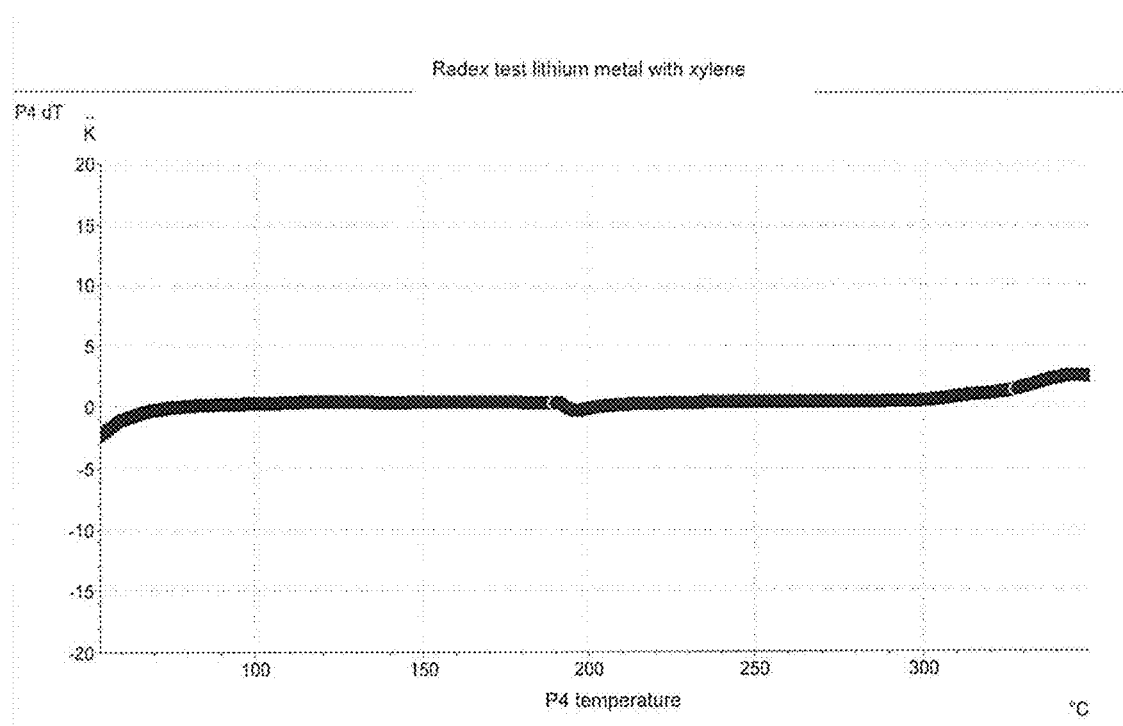
Fig. 3: Stability of Li-Powder in contact with xylene to 350 °C
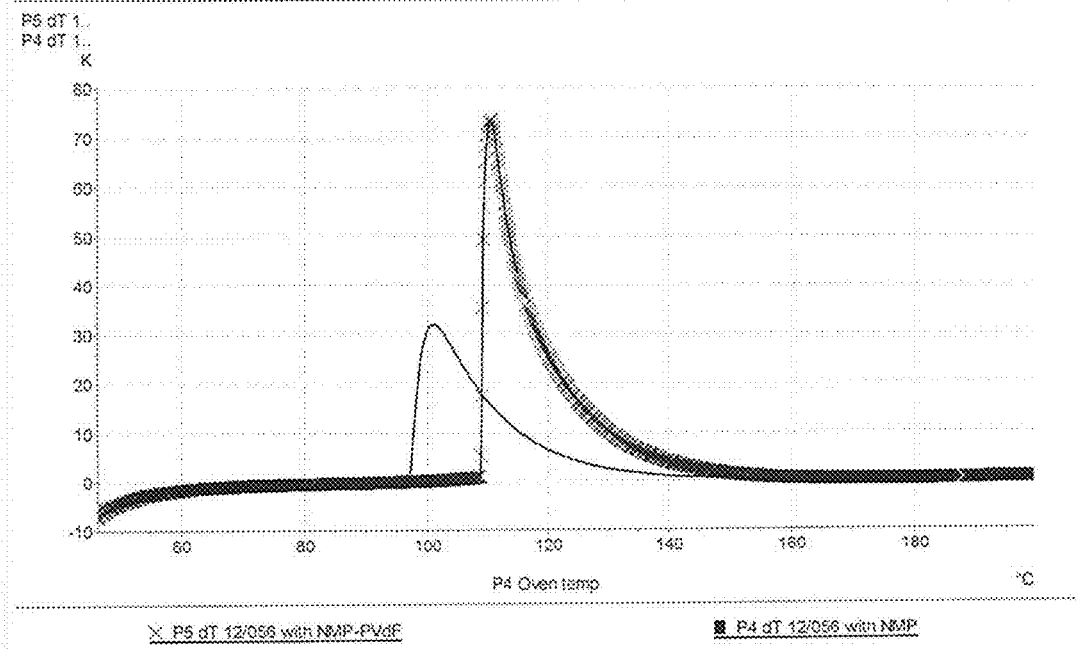
Fig. 4: Stability of Li-powder in presence of NMP or NMP-PVdF

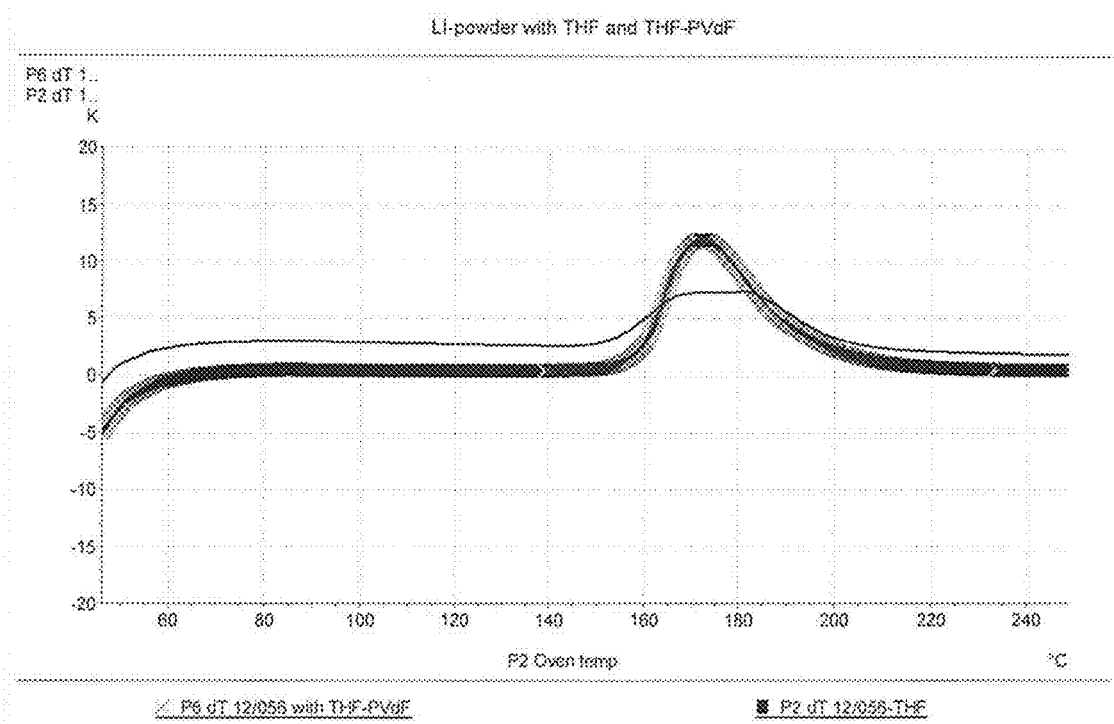
Fig. 5: Stability of Li-Powder in the presence of THF or THF-PVdF

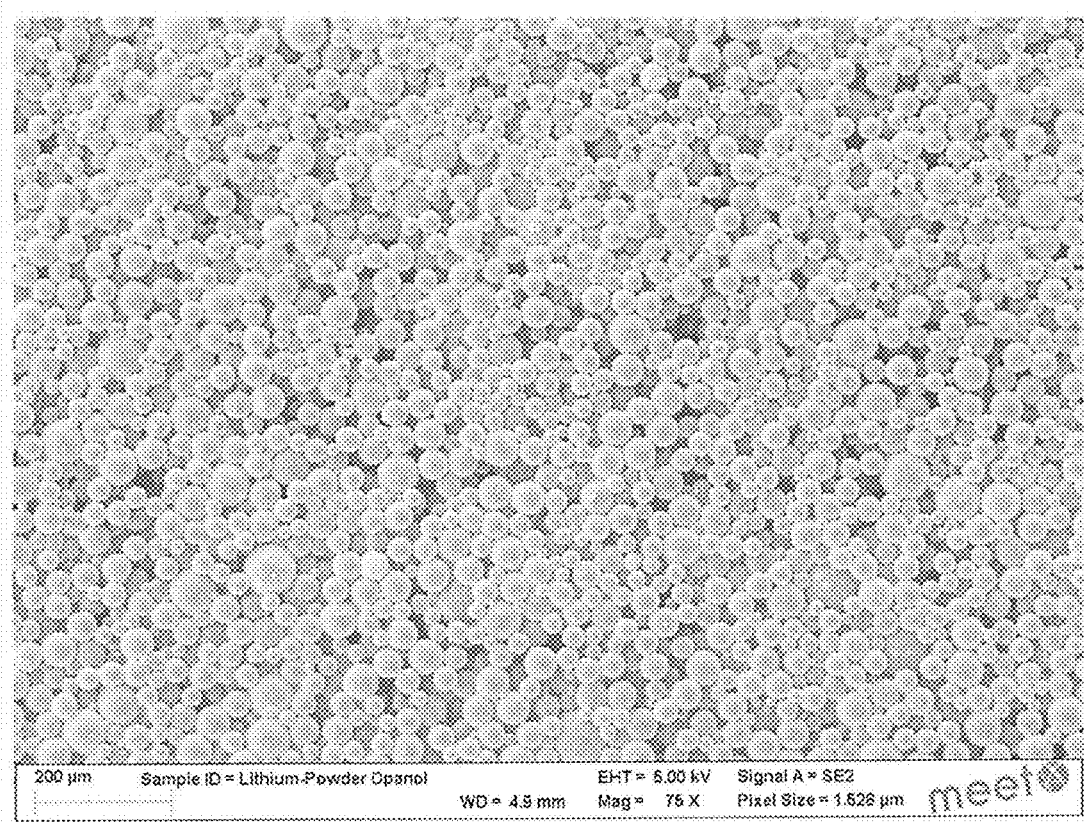
Fig. 6: REM-image (magnification 200 μm) of a lithium metal anode bonded with OPPANOL/hexane.

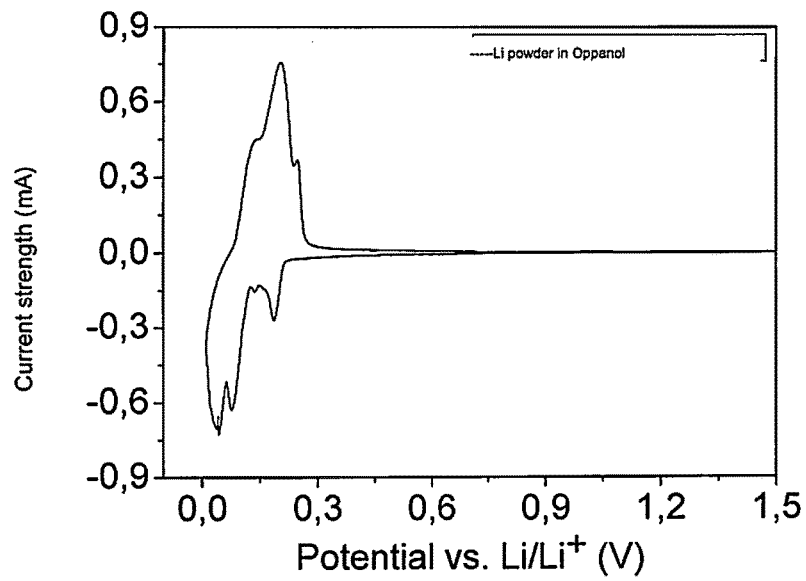
Fig. 7: CV of a lithium metal anode bonded with OPPANOL B200, potential range 0.025-1.5 V, scan rate 25 μV. Counter-electrode graphite MAGD.
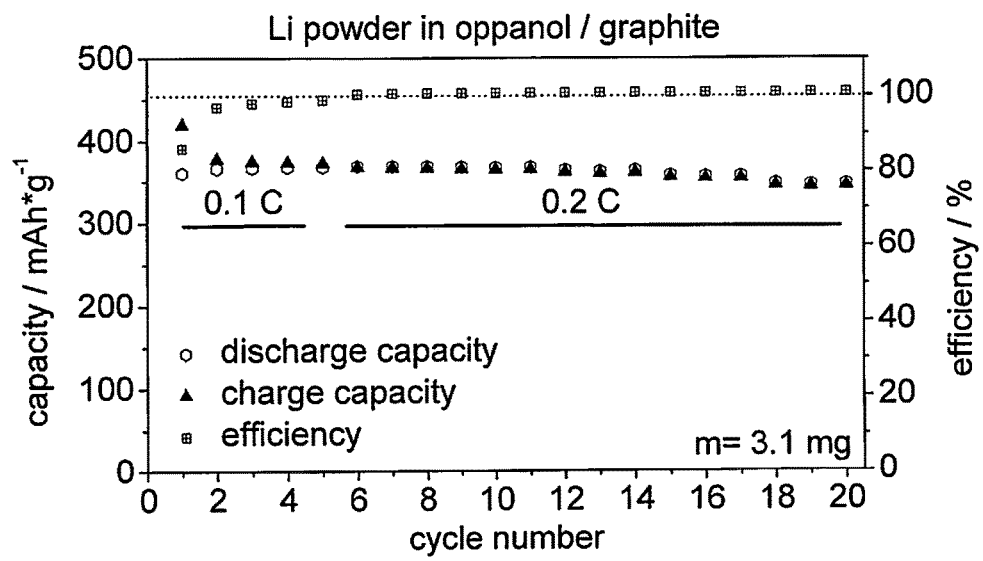
Fig. 8: Cycle test (CCCV) of a lithium metal alloy bonded with OPPANOL B200 (supplier: BASF) and graphite as the counter-electrode. The capacity refers to the capacity of the hydrocarbon electrode. Current density is 1.2 mA/cm$^2$.

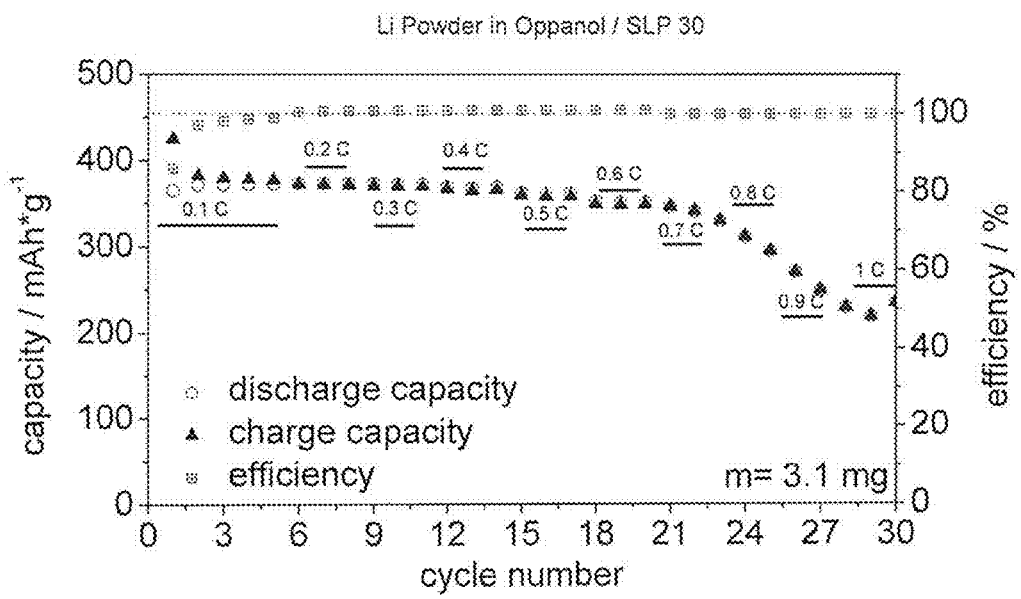
Fig. 9: C-rates study of a lithium metal anode bonded with OPPANOL and graphite as the counter-electrode. The capacity refers to the capacity of the hydrocarbon electrode, current density is 1.2 mA/cm$^2$.
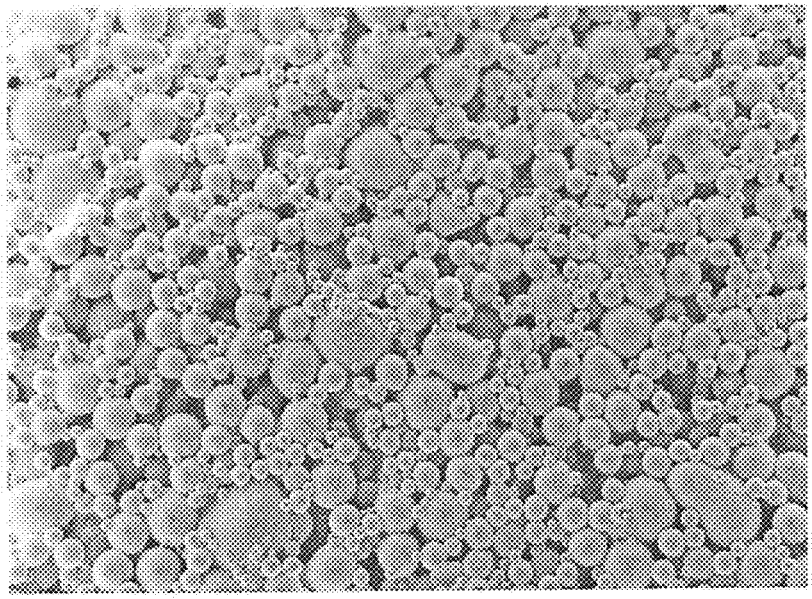
Fig. 10: REM-image (magnification 200 μm) of a lithium metal anode bonded with PVdF/NMP.

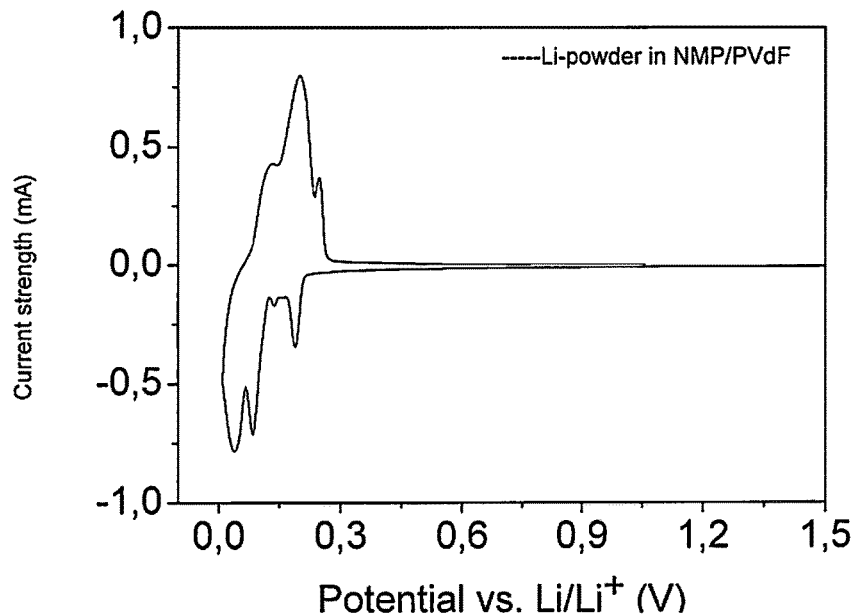
Fig. 11: CV of a lithium metal anode bonded with PVdF/NMP. Potential range 0.025-1.5 V, scan rate 25 µV. Counter-electrode: graphite.
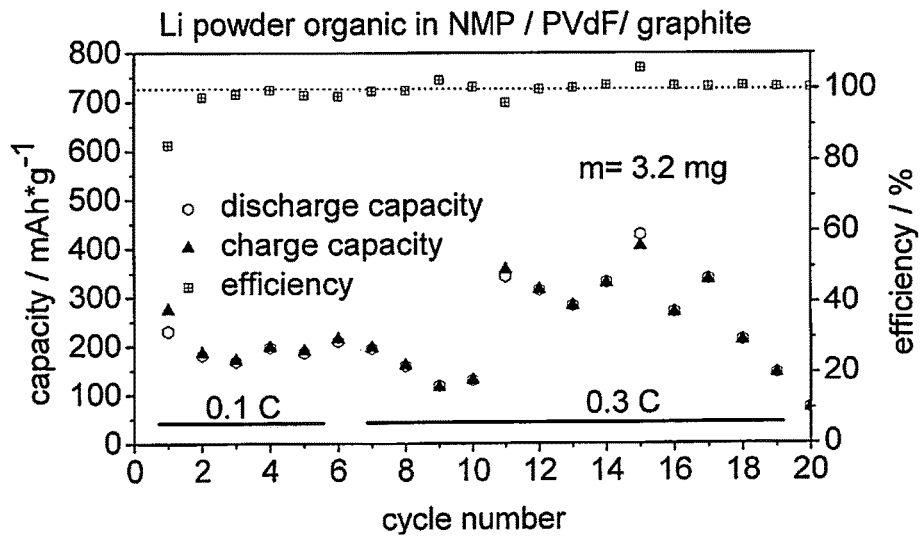
Fig. 12: Cycle test of a lithium metal anode bonded with PVdF/NMP and graphite as the counter-electrode. The capacity refers to the capacity of the hydrocarbon electrode. Current density is 1.2 mA/cm$^2$.

LITHIUM POWDER ANODE

This application is a §371 of International Application No. PCT/EP2013/076364 filed Dec. 12, 2013, and claims priority from German Patent Application Nos. 10 2012 223 826.3 filed Dec. 19, 2012 and 10 2013 202 769.9 filed Feb. 20, 2013.

Rechargeable electrochemical storage systems are currently acquiring increasing importance in many areas of daily life. Apart from long existing applications as automotive starter batteries and as an energy source for portable electronics, strong gains are predicted for the future for propulsion of electric cars and for stationary energy storage. Traditional lead/acid batteries are out of the question for the new applications, because they have much too low a capacity and too short a cycle life. Lithium batteries, on the other hand, are conceded to have the best chance.

While primary (i.e. non-rechargeable lithium batteries) generally have a lithium metal anode, rechargeable lithium batteries, that is in general lithium ion batteries, for safety reasons contain no metal lithium, but a graphitic material as anode. The use of graphite, which in the charged state can be charged to the limiting composition of $LiC_6$, has the result, however, that the capacity compared to the use of metallic lithium is significantly lower. The use of metallic lithium as anode material in comparison with graphite brought a marked increase both in volumetric and in gravimetric capacities:

| Theoretical capacities | Graphite | Lithium metal |
|---|---|---|
| gravimetric (Ah/kg) | 372 | 3,860 |
| volumetric (Ah/L) | 841 | 2,061 |

The use of lithium anodes consisting of sheet-like lithium is therefore not possible first of all because in particular at high current densities in the charging process, generally lithium deposition is not planar but dendritic, i.e. needle-shaped. Because of this it is possible that parts of the lithium are pinched off, i.e. they lose electrical contact with the rest of the anode. The result is a relatively fast capacity drop during continued cycling of the galvanic cell. Another problem is that dendrites can grow through the separator. This can cause a short circuit with high heat release. The lithium melting point can then easily be exceeded. Melted lithium is enormously reactive and in contact with flammable battery components (organic electrolyte, for example), an explosion-like passage through the cell cannot be ruled out ("thermal runaway") (M. Winter, J. O. Besenhard, Chemie in unserer Zeit [Chemistry in Our Time] 33 (1999) 320-331 [closing parentheses missing in original]. It is known that the tendency toward dendrite formation depends on the surface-related current intensity. A sheet-like lithium (lithium film) has a significantly lower specific surface area than an electrode that consists of powdery lithium metal. In BET measurements (analytical method per Brunauer, Emmet, and Teller) it was possible to show that mechanically at a pressure of 15 MPa, compacted Li-particles (diameter 20 μm) have a specific surface area of around 0.4 $m^2$/g (M. S. Park, W. Y. Yoon, J. Power Sources 114 (2003) 237-243). The result is that powder anodes produced in this way have substantially better cycle strength. Thus with a compressed powder anode with a cycle rate of C/2, at least 100 cycles may be observed without significant capacity loss, while with a film electrode starting with the 40th cycle a drastic capacity collapse is observed (J. S. Kim, S. Baek, W. Y. Yoon, J. Electrochem. Soc. 157 (2010) A984-A987). Disadvantageously, in the pressing method for production of a lithium powder anode, however, this method is not scale-up-capable, or is so only at great expense. Modern, efficient methods of electrode band production consist in producing a suspension of active materials with the addition of a binding agent in a solvent, and applying this suspension by a coating process (casting, printing, etc.) onto the current-dissipating film. Suitable binders include, for example, partially fluorinated polymers such as polyvinylidene difluoride (PVDF). This polymer dissolves only in very strongly polar solvents, however, such as N-methylpyrrolidone (NMP) or dimethyl sulfoxide (DMSO), also (conditionally) in acetone or tetrahydrofurane (THF). Thus the production of an Li powder anode in the suspension process with the use of a PVdF binder and THF as the solvent was described (C W Kwon, et al., J. Power Sources 93 (2001) 145-150).

The use of a strongly polar solvent for the dispersion of lithium powder is only conditionally possible or practical, however. Based on the relatively high reactivity even of coated (thus protected) lithium powder, the possibility of intense reactions (frequently runaway) in anode production cannot be ruled out. Thus in order to avoid a thermal event, the anode manufacture must be carried out at the lowest possible temperatures (room temperature or lower); in addition the solvent must dissolve the PVdF binder even at mild temperatures, and in the subsequent anode drying, it must be removed as easily as possible. Unfortunately all such known effective solvents have a relatively high boiling point. This is demonstrated by the following table:

| Solvent[a] | Boiling temperature [° C.] | Flashpoint [° C.] |
|---|---|---|
| Dimethylformamide | 153 | 67 |
| Dimethylacetamide[b] | 166 | 70 |
| Tetramethylurea | 177 | 65 |
| Dimethyl sulfoxide | 189 | 35 |
| Triethylphosphate | 215 | 116 |
| N-methyl-2-pyrrolidone[b] | 202 | 95 |

[a]active solvents, that dissolve at least 5 to 10% (KYNAR® resin) PVdF at room temperature
[b]most common solvents Reactivity to lithium metal does not allow safe work using the above solvents. In the present application, some data are shown.

There are polar, less reactive solvents for PVdF, THF for example, that are somewhat less reactive to lithium powder. But these dissolve PVdF only at higher temperatures.

| Solvent[c] | Boiling temperature [° C.] | Flashpoint [° C.] |
|---|---|---|
| Acetone | 56 | −18 |
| Tetrahydrofurane | 65 | −17 |
| Methyl ethyl ketone | 180 | −6 |
| Methyl isobutyl ketone | 118 | 23 |
| Glycol ethers[d] | 118 | 40 |
| Glycol ether esters[d] | 120 | 30 |
| n-butyl acetate | 135 | 24 |
| Cyclohexanone | 157 | 54 |
| Diacetone alcohol | 167 | 61 |
| Diisobutylketone | 169 | 49 |
| Acetoacetic ester | 180 | 84 |
| Butyrolactone | 204 | 98 |
| Isophorone | 215 | 96 |
| Carbitol acetate | 217 | 110 |

| Solvent[c] | Boiling temperature [° C.] | Flashpoint [° C.] |
|---|---|---|
| Propylene carbonate | 242 | 132 |
| Glycerol triacetate | 258 | 146 |
| Dimethyl phthalate | 280 | 149 |

[c]latent agents do not substantially dissolve or swell (KYNAR ® ) PVdF-homopolymers at room temperature; they dissolve (KYNAR ® resin) PVdF at higher temperatures, but upon cooling the resin crystallizes (for example the resin is precipitated out of the solution)
[d]Based on ethylene glycol, diethylene glycol, and propylene glycol Owing to the necessity of using higher temperatures, the advantage of lower reactivity to metallic lithium is nullified.

It is further known how to produce electrodes from a mixture comprising particles from an electrochemically active material, a binder, and a solvent and/or dispersing agent, wherein the binder must be at least partially a polyisobutene, and the solvent and/or dispersing agent at least partially consists of at least one aromatic hydrocarbon, and wherein the electrochemically active material can be, among other things, lithium in passivated metallic form (WO2012/100983). This method likewise has disadvantages, however. On the one hand, many aromatic solvents, for example with the benzene basic structure, are classified as poisons. Furthermore, aromates are still capable of reacting to metallic lithium, at least at higher temperatures. Finally, it is known that aromates such as cyclohexyl benzene or biphenyl, for example, are electrochemically active, that upon exceeding a specific potential they polymerize and are also reductively sensitive, in particular in contact with a lithium metal anode (for example Y. Watanabe, J. Power Sources 154 (2006) 246). It is therefore necessary to dry electrode bands produced using aromatic solvents with extraordinary care. This process is protracted and accordingly cost-intensive.

The problem addressed by the present invention is to provide a binder system for producing lithium metal powder anodes that assures safe handling even at higher temperatures
allows the use of solvents as non-toxic as possible, with optimal volatility in terms of technical applications
uses solvents that have no negative consequences in lithium batteries, i.e. that are not electrochemically active, and
assures at least equally good binding properties as PVdF binders.

The problem is solved in that fluorine-free binder systems and solvents are used that are not reactive to lithium. Saturated or unsaturated rubber-like polymers are used as binders. These binders are in general swellable and in part soluble in fluid hydrocarbons.

Surprisingly, it was found that lithium powder is extraordinarily thermally stable with respect both to the binders according to the invention and to the solvents that are used, as a rule up to significantly above the temperature of the lithium melting point (180° C.).

The rubber-like polymers preferably contain only the elements C and H. These are saturated polyolefins and polyolefin copolymers such as ethylene-propylene copolymers (EPM), ethylene-propylene terpolymers (EPDM), and polybutenes. Furthermore unsaturated polymers are suitable; these include diene polymers and diene copolymers such as natural rubbers (NR), butadiene rubbers (BR), styrene-butadiene rubbers (SBR), polyisoprene rubbers and butyl rubbers (IIR, such as polyisobutylene-isoprene rubbers, PIBI). Depending on the exact polymer structure (chain length, tacticity, etc.), representatives of the named polymer groups have different solubilities. Those products are preferred that dissolve in solvents that are non-reactive to lithium metal (e.g. hydrocarbons).

Furthermore, heteroelement-containing copolymers can be used, for example saturated copolymer rubbers such as ethylene-vinyl acetate (EVM), hydrogenated nitrile butadiene rubbers (HNBR), epichlorohydrin rubbers (ECO), acrylate rubbers (ACM) and silicon rubbers (SI), and unsaturated copolymers such as nitrile rubbers (NBR).

Especially preferred are EPDM terpolymers (for example under the brand name Nordel IP 4570 from Dow) or polyisobutenes (for example OPPANOL-types such as OPPANOL B200, from BASF). It was found that these binders are soluble in solvents inert with respect to lithium metal, that is, saturated hydrocarbons, and that these binder solutions have a very high stability with respect to lithium metal. In addition, surprisingly it was found that lithium powder anodes produced with binder systems according to the invention have significantly better cycling properties than those produced with a fluoropolymer (PVdF).

The following table shows the start of the decomposition reactions defined per DSC tests between different solvents as well as solvent-binder combinations and lithium metal powder:

| | Solvent/ Binder | | | | | | |
|---|---|---|---|---|---|---|---|
| | NMP | NMP/ PVdF | THF | THF/ PVDF | Xylene | Decane | Decane/ OPPANOL |
| Start of thermal decomposition (° C.) | 90 | 110 | 140 | 140 | ca. 300 | >350 | >250 |
| Heat of reaction | intense | extremely intense | medium | intense | mild | none | none |

The experimental set-up is as follows: 2 ml solvent or around 2 ml solvent and 100 mg of the respective binder and 100 mg of coated lithium metal powder were filled into an argon-filled glove box in steel autoclaves of the RADEX system of the Systag Co. (Switzerland) and hermetically sealed. These mixtures were then heated at a heating rate of 45 K/h up to final temperatures of 200° C. (NMP-containing mixtures) or 250 or 350° C. (hydrocarbon-containing mixture) and the thermal events registered.

In comparison with the fluorinated polymer PVdF, quite clear stability advantages can be identified for the use of OPPANOL B200: OPPANOL-containing mixtures in saturated hydrocarbons stable with respect to metallic lithium up to at least 250° C. Whereas in the case of saturated hydrocarbon decane, no significant exothermic process is observed up to a final temperature of 350° C., in the case of the mixture of lithium metal with the aromatic solvent xylene, a significant exothermic process is observed starting at 300° C.

The production of planar lithium-powder based anodes using binder systems according to the invention takes place similarly to when PVdF is used.

The binder is initially dissolved in a solvent or a solvent mixture that is volatile and inert with respect to lithium metal. The solvent preferably contains one or a number of liquid hydrocarbons with boiling points between 35 and 300° C., preferably 60 and 200° C. These can be saturated open-chain or cyclic compounds such as hexanes, heptanes, octanes, decanes or dodecanes. They can also be commercially available hydrocarbon boiling ranges such as Shellsol D70 or D100. Furthermore, the solvent or solvent mixture can also contain or consist of ethers such as diethyl ether, dibutyl ether, diphenyl ether, tetrahydrofurane, tetrahydropyran or glymes (ethylene glycol dialkyl ether). Solvents containing only saturated hydrocarbons are preferred. Due to the variety also of commercially available hydrocarbon products of different chain lengths, a wide range of the boiling point and the volatility of the solvent can be selected. The concentration of the binder is determined by the respective solubility in the solvent that is used, as well as the viscosity of the solution that is produced. In general, the concentration varies between 0.1 and 20 wt %, preferably 1 and 10 wt %.

The lithium powder is mixed, together with possible additional excipients, including for example conductivity-enhancing additives (carbon black, finely divided graphite or metal powder not alloyable with lithium, such as Ti and Ni powder), with the binder solution. The lithium powder consists of spherical lithium metal particles that have an average particle diameter ($D_{50}$) (particle size determination by laser light scattering measurement using a Lasentec FBRM from Mettler Toledo) between 5 and 200 μm, preferably 10 and 100 μm. The lithium particles preferably have an inerting coating according to prior art (for example U.S. Pat. No. 8,021,496; WO 2012/052265).

Depending on the consistency of the mixture, an additional solvent non-reactive or inert with respect to lithium may be added. The mixing process is carried out through agitation, stirring, or some other solid/liquid mixing process. The weight ratio (Wt:Wt) between the dry binder material and the lithium powder generally is between 1 to 1-1,000, preferably 1 to 10-200.

Preferably, the mixing process is carried out gently, i.e. in a manner which prevents mechanical deformation or damage of the lithium beads.

The homogenized suspension is then applied according to the prior art by casting, printing, and the like to an current-dissipating film/foil consisting of an electrically conductive material that is inert with respect to lithium. This material is preferably a thin nickel or copper foil.

After the coating process, the wet anode layer is dried. This is done by evaporation of the solvent, either at room temperature (RT) or slightly elevated temperature (maximum 80° C.), optionally under reduced pressure.

The suspension production and assembly takes place in an environment with which the anode materials used are compatible. This is either dry air (dew point preferably ≤−40° C.) or an inert atmosphere (preferably helium or argon). After drying of the anode coating, a compression process may follow, for which a calender is generally used.

The lithium metal anode produced according to the invention has a layer thickness between 10 and 500 μm, preferably 15 to 100 μm. Lithium metal anodes produced according to the invention are for the purposes of the invention designated as binder-based lithium anodes.

The lithium anode according to the invention is used as an electrode for lithium batteries. Preferably, it is connected to low-lithium or lithium-free cathode materials. Such cathode materials include sulfur, transition metal oxides (e.g. manganese oxide, vanadium oxide, copper oxide), conversion cathode materials (e.g. nanoscale metal fluorides and metal oxyfluorides). Furthermore, they can be used as a negative electrode for lithium-air batteries.

The invention is illustrated with reference to the following four examples and four comparative examples and FIGS. 1 to 11.

Wherein:

FIG. 1: Shows the stability of Li powder in contact with decane and decane-OPPANOL B200

FIG. 2: Shows the stability of lithium metal powder in contact with decane to 350° C.

FIG. 3: Shows the stability of Li powder in contact with xylene to 350° C.

FIG. 4: Shows the stability of Li powder in the presence of NMP or NMP-PVdF

FIG. 5: Shows the stability of Li powder in the presence of THF or THF PVdF

FIG. 6: REM image (magnification 200 μm] of a lithium anode bonded with OPPANOL/hexane FIG. 7: Cyclovoltagram (CV) of a lithium bonded with OPPANOL B200. Potential range from 0.025 to 1.5 V, scan rate 25 μV. Counter-electrode: graphite MAGD [artificial graphite].

FIG. 8: Cycle test (CCCV) of a lithium anode bonded by means of OPPANOL 8200 (supplier: BASF) and graphite as the counter-electrode. The capacity refers to the capacity of the hydrocarbon electrode. The current density is 1.2 mA/cm$^2$.

FIG. 9: C-rate study of lithium anode bonded with OPPANOL and graphite as the counter-electrode. The capacity refers to the capacity of the carbon electrode. Current density is 1.2 mA/cm$^2$.

FIG. 10: REM image (magnification 200 μm] of a lithium anode bonded with PVDF/NMP.

FIG. 11: CV of a lithium anode bonded by means of PVdF/NMP. Potential range of 0.025-1.5 V, scan rate 25 μV, counter-electrode: graphite FIG. 12: Cycle test of lithium anode bonded by means of a PVDF/NMP lithium anode and graphite as the counter-electrode. Capacity refers to the capacity of the hydrocarbon electrode. The current density is 1.2 mA/cm$^2$.

All operations were carried out in an Ar-filled glove box or in a dry room. The cycling studies were carried out with the aid of a potentiostat from the Maccor Co.

EXAMPLE 1

Stability of Lithium Metal Powder in Contact with Decane and a Solution of Oppanol in Decane (Aging Temperature to 250° C.)

Around 2 ml of decane or about 2 ml of decane and 100 mg Oppanol B200 (supplied by BASF) were each filled with 100 mg of lithium metal powder in an argon-filled glove box in the autoclave of the RADEX system from the Systag Co. (Switzerland) and hermetically sealed. These mixtures were then heated at a heating rate of 45 K/h up to final temperatures of 250° C. and the thermal events were registered (see FIG. 1).

EXAMPLE 2

Stability of Lithium Metal Powder in Contact with Decane (Aging Temperature to 350° C.)

Experimental set-up as in Example 1 (see FIG. 2).

COMPARISON EXAMPLE 1

Stability of Lithium Metal Powder in Contact with Xylene (Aging Temperature to 350° C.); Experimental Setup as in Example 1 (See FIG. 3.)

COMPARISON EXAMPLE 2

Stability of Lithium Metal Powder in Contact with N-Methyl Pyrrolidone (NMP) and a Solution of PVdF in NMP In the same RADEX structure, NMP and NMP/PVDF were tested for thermal stability with respect to lithium powder (FIG. 4). The PVDF used was a product of Solvay Plastics (SOLEF®).

COMPARISON EXAMPLE 3

Stability of Lithium Metal Powder in Contact with Tetrahydrofuran and a Solution of PVdF in Tetrahydrofuran In the same RADEX structure, THF and THF/NMP were tested for thermal stability with respect to lithium powder (FIG. 5).

EXAMPLE 4

Production of a Lithium Anode Bonded with Oppanol® B200 Using the Solvent Hexane Variant 1: 1-20% by weight of OPPANOL B200 are dissolved while stirring in hexane. This process takes from 1 hour to 1 day, depending on the temperature and concentration. Lithium metal powder is added while stirring and the suspension is homogenized with a Vortex. The electrode suspension thus obtained is applied by means of a palette knife (doctor blade) to a copper foil. All operations using lithium metal powder are carried out either in an Ar-filled glove box or in a dry room with a dew point of not more than −40° C.

Depending on the proportion by weight of lithium metal powder, the layer thickness of the electrode can be varied. The minimum layer thickness is determined by the particle size of the lithium metal powder. The wet layer thickness of the electrode may vary between 10 and 500 µm. FIG. 6 shows a metal powder anode prepared according to the indicated method.

Variant 2: Another option is to add a conductivity additive to the hexane/OPPANOL solution, for example, a graphite powder such as Timrex® SFG or Timrex® SLP or conductive carbon blacks such as Super P® or ENASCO® 250G (all of these products may be obtained from the Timcal Co., Switzerland). The conductivity additives are generally used in concentrations in the range of 1-10 wt % (based on the amount of lithium powder).

Variant 3: Alternatively, the hexane/OPPANOL solution can be applied directly to a copper foil and the lithium metal powder sprinkled onto the solution. In this way, a monolayer of lithium metal particles can be applied.

The coated, wet electrodes are dried under vacuum at 80° C., punched into the desired shapes, and analyzed electrochemically.

EXAMPLE 5

Cycle Test with the Lithium Anode Bonded According to Example 3 (Variant 1)

Using the anode according to the invention from Example 3, electrochemical cells (swagelock design) were prepared. The cells contained, as the cathode, a graphite MAGD of Hitachi Co., Kasai, Japan, electrolyte LP30® (Merck, Germany) and a polyolefin separator of the Celgard Co., USA (Celgard+FS2226®). In each case, a number of charge-discharge cycles were carried out using a Maccor potentiostat (4300 Battery Test System, Maccor Inc., Tulsa, Okla., USA). The indicated capacities each refer to the capacity of the graphite electrode.

The results obtained are shown in the following figures:

FIG. 6: REM image (magnification 200 µm] of a lithium anode bonded with OPPANOL/hexane.

FIG. 7: CV of a lithium anode bonded with OPPANOL B200. Potential range of 0.025-1. 5 V, scan rate 25 µV, counter-electrode: MAGD graphite.

FIG. 8: Cycle test (CCCV) of a lithium anode bonded with OPPANOL B200 (supplier: BASF) and graphite as the counter-electrode. The capacity refers to the capacity of the carbon electrode. The current density is 1.2 mA/cm$^2$.

FIG. 9: C-rate study of a lithium anode bonded with OPPANOL and graphite as the counter-electrode. The capacity refers to the capacity of the carbon electrode. Current density is 1.2 mA/cm$^2$.

COMPARISON EXAMPLE 4

Preparation of a Lithium Anode Bonded with PVDF Using the Solvent NMP 1-20 wt % PVDF (supplier Solvay, France, PVdF 1013) was dissolved while stirring in NMP. Then the lithium metal particles are added, wherein the metal concentration in the PVDF/NMP suspension is generally between 50 and 90 wt %. The electrode suspension thus obtained is applied by means of a palette knife (doctor blade) to a copper foil. The electrode production was carried out in a drying room.

Depending on the proportion by weight of lithium metal powder, the layer thickness of the electrode can be varied. The minimum layer thickness is determined by the particle size of the lithium metal powder. The wet film thickness of the electrode may vary between 10 and 500 µm.

The solvent-wet electrodes are dried in a vacuum and the desired shapes are punched out.

COMPARISON EXAMPLE 5

Cycle Studies with the Bonded Lithium Anode Produced According to Comparison Example 3

Using the PVdF-bonded anode of comparison example 3, electrochemical cells (Swagelock design) were produced.

The cells contained, as the cathode, a graphite MAGD from Hitachi Corp., Kasai, Japan; as the electrolyte, LP30® (Merck, Germany); and a polyolefin separator from Celgard, USA (Celgard+FS2226®). In each case, a number of charge-discharge cycles were carried out using a potentiostat from the Maccor Company (4300 Battery Test System, Maccor Inc., Tulsa, Okla., USA). The stated capacities are each based on the capacity of the graphite electrode.

The results obtained are shown in the following figures:

FIG. 10: REM image (magnification 200 µm) of a lithium anode bonded with PVDF/NMP lithium.

FIG. 11: CV of a lithium anode bonded with PVdF/NMP lithium anode. Potential range of 0.025-1.5 µV, scan rate 25 µV. Counter-electrode: graphite.

FIG. 12: Cycle test of a lithium anode bonded by PVdF/NMP and graphite as the counter-electrode. The capacity refers to the capacity of the carbon electrode. Current density is 1.2 mA/cm$^2$.

The advantage of the lithium anode bonded with OPPANOL/saturated hydrocarbon dispersant is that significantly higher charging and discharging rates can be implemented than when a PVdF binder is used, see FIG. 8 and FIG. 11. Furthermore, when OPPANOL is used, there are fewer fluctuations between successive cycles, i.e., the cycle behavior is more stable.

The invention claimed is:

1. A lithium metal anode for a galvanic cell comprising: spherical lithium metal particles having an average diameter between 5 and 200 µm as electrochemically active material of the anode present in an amount in the range of 88.3 to 99.5 wt. % of the total anode mass in a charged state and excluding mass attributable to any current-dissipating film/foil present in the anode, and wherein the spherical lithium metal particles are bonded by a fluorine-free rubber-like binder.

2. The lithium metal anode according to claim 1, wherein the spherical lithium metal particles preferably have an average diameter between 10 and 100 µm.

3. The lithium metal anode according to claim 1, wherein it contains no aromatic solvents.

4. The lithium metal anode according to claim 1, wherein the fluorine-free binder is selected from the group consisting of a saturated polyolefin, a polyolefin copolymer, an unsaturated polymer and a heteroelement-containing copolymer.

5. The lithium metal anode according to claim 1, wherein the binder is selected from the group consisting of an ethylene-propylene terpolymer and a polyisobutene.

6. The lithium metal anode according to claim 1, wherein the anode further comprises a conductivity-enhancing additive.

7. The lithium metal anode according to claim 6, wherein the conductivity-enhancing additive is selected from the group consisting of carbon black, finely divided graphite and a lithium non-alloyable metal powder.

8. The lithium metal anode according to claim 1, wherein the lithium metal anode has a layer thickness between 10 and 500 µm.

9. The lithium metal anode according to claim 1, wherein the fluorine-free binder is selected from the group consisting of an ethylene-propylene copolymer, an ethylene-propylene terpolymer, a polybutene, a natural rubber, a butadiene rubber, a styrene-butadiene rubber, a polyisoprene rubber, a butyl rubber, ethylene vinyl acetate, hydrogenated nitrile-butadiene rubber, epichlorhydrin rubber, an acrylate rubber, a silicon rubber and nitrile rubber.

10. A galvanic cell comprising:
bonded lithium anode containing spherical lithium metal particles having an average diameter between 5 and 200 µm as electrochemically active material of the anode present in an amount in the range of 88.3 to 99.5 wt. % of the total anode mass in a charged state and excluding mass attributable to any current-dissipating film/foil present in the anode, wherein the spherical lithium metal particles are bonded by a fluorine-free rubber-like binder.

11. The galvanic cell according to claim 10, wherein the fluorine-free binder is selected from the group consisting of a saturated polyolefin, a polyolefin copolymer, an unsaturated polymer and a heteroelement-containing copolymer.

12. The galvanic cell according to claim 10, wherein the fluorine-free binder is selected from the group consisting of an ethylene-propylene copolymer, an ethylenepropylene terpolymer, a polybutene, a natural rubber, a butadiene rubber, a styrenebutadiene rubber, a polyisoprene rubber, a butyl rubber, ethylene vinyl acetate, hydrogenated nitrile-butadiene rubber, epichlorhydrin rubber, an acrylate rubber, a silicon rubber and nitrile rubber.

13. A method for producing a lithium metal anode comprising the steps of:
suspending spherical lithium metal particles having an average diameter between 5 and 200 µm in the solution of a fluorine-free binder in a solvent, wherein the solvent is inert with respect to lithium metal;
applying said suspension to an electrically conductive film/foil; and
evaporating the solvent from the anode layer;
wherein the amount of lithium metal particles as electrochemically active material of the anode is in an amount in the range of 88.3 to 99.5 wt. % of the total anode mass in a charged state and excluding mass attributable to any current-dissipating film/foil present in the anode.

14. The method according to claim 13, wherein the fluorine-free binder is selected from the group consisting of a saturated polyolefin, a polyolefin copolymer, an unsaturated polymer and a heteroelement-containing copolymer.

15. The method according to claim 13, wherein the solvent comprises a liquid saturated hydrocarbon having a boiling point between 25 and 300° C.

16. The method according to claim 13, wherein the solvent is selected from the group consisting of a saturated open-chain compound and a saturated cyclic compound.

17. The method according to claim 13, wherein the solvent comprises at least one of an ether or a glyme.

18. The method according to claim 13, wherein the suspension further comprises a conductivity-enhancing additive.

19. The method according to claim 13, wherein the lithium metal anode is applied in a layer thickness between 10 and 500 µm to the electrically conductive film/foil.

20. The method according to claim 13, wherein after drying of the anode coating, the anode is compressed.

* * * * *